United States Patent [19]

Duncan et al.

[11] Patent Number: 4,873,051
[45] Date of Patent: Oct. 10, 1989

[54] NUCLEAR FUEL GRID OUTER STRAP

[75] Inventors: Robert Duncan, Fork; James E. Craver, Lexington, both of S.C.

[73] Assignee: Westinghouse Electric Corp., Pittsburgh, Pa.

[21] Appl. No.: 178,723

[22] Filed: Apr. 6, 1988

[51] Int. Cl.[4] .............................................. G21C 3/34
[52] U.S. Cl. .................................... 376/438; 376/462
[58] Field of Search ............................... 376/438, 462

[56] References Cited

U.S. PATENT DOCUMENTS

| | | |
|---|---|---|
| Re. 30,065 | 8/1979 | Anthony et al. |
| 3,361,639 | 1/1968 | Ashcroft et al. |
| 3,366,546 | 1/1968 | Anthony et al. |
| 3,481,021 | 12/1969 | Glandin et al. |
| 3,679,546 | 7/1972 | Muellner et al. |
| 3,746,618 | 7/1973 | Nakazato |
| 3,852,154 | 12/1974 | Carlson et al. |
| 3,856,623 | 12/1974 | Kamo |
| 4,059,484 | 11/1977 | Bupp et al. |
| 4,081,324 | 3/1978 | Flora et al. |
| 4,221,636 | 9/1980 | Feutrel |
| 4,314,884 | 2/1982 | Fanning et al. |
| 4,351,795 | 9/1982 | Nicholson |
| 4,357,298 | 11/1982 | Wolters, Jr. et al. |
| 4,388,269 | 6/1983 | Larson |
| 4,486,384 | 12/1984 | Rau et al. |
| 4,521,374 | 6/1985 | Duncan |
| 4,541,055 | 9/1985 | Wolfe ................................ 364/474 |
| 4,576,786 | 3/1986 | DeMario ............................ 376/439 |
| 4,585,615 | 4/1986 | DeMario |
| 4,585,616 | 4/1986 | DeMario et al. |
| 4,636,606 | 1/1987 | Chastanet et al. |
| 4,683,115 | 7/1987 | Fromel et al. |
| 4,686,079 | 8/1987 | Ishikawa et al. |
| 4,708,845 | 11/1987 | Mildrum ............................ 376/435 |
| 4,709,909 | 12/1987 | Duncan ............................ 269/41 |
| 4,714,585 | 12/1987 | Kast .................................. 376/442 |
| 4,716,015 | 12/1987 | Carlson ............................. 376/445 |

OTHER PUBLICATIONS

"Nuclear Reactor Core Containing Fuel Assemblies Positioned Adjacent Core Baffle Structure Having Annular Anti-Vibration Grids," by Pratap K. Doshi; U.S. Ser. No. 07/050,833, filed May 13, 1987.

"Nuclear Fuel Rod Grid Spring Structure," by Edmund E. DeMario; U.S. Ser. No. 07/053,990, filed May 22, 1987, which involves unique fuel rod engaging spring structures.

"Spacer For Nuclear Fuel Rods," by Edmund E. DeMario et al.; U.S. Ser. No. 109,832, filed Oct. 16, 1987.

"Boiling Water Reactor Fuel Assembly With Cross-Flow Elimination at Upper Spacer Locations", by Rusi P. Taleyarkham; U.S. Ser. No. 886,843, filed Jul. 18, 1986.

"BWR Fuel Assembly Having Fuel Rod Spacers Axially Positioned By Exterior Springs," by Rusi P. Taleyarkhan; U.S. Ser. No. 888,294, filed Jul. 22, 1986.

"Fuel Rod Spacer With Perimeter Scoops For Diverting Coplant Flow," by Rusi P. Taleyarkham; U.S. Ser. No. 06/908,140, filed Sep. 17, 1986.

Primary Examiner—Donald P. Walsh

[57] ABSTRACT

A nuclear fuel assembly grid comprising an improved outer grid strap wherein abutting outer grid strap segments are joined at a point of intersection with an inner grid strap. The normally preformed weld where the inner strap fork tines extend through the outer grid strap thereby fixedly bonds the outer grid strap segments together.

23 Claims, 5 Drawing Sheets

NUCLEAR FUEL GRID OUTER STRAP

BACKGROUND OF THE INVENTION

This invention, in its preferred form, relates generally to a nuclear fuel assembly grid having interleaved inner grid straps and an outer grid strap forming the perimeter thereof. More particularly, the invention relates to the outer grid strap segments which have improved means for connecting same.

Nuclear fuel assembly grids are used to precisely maintain the spacing between fuel rods in a nuclear reactor core, prevent rod vibration, and provide lateral support for the fuel rods. Grids are made of materials with low neutron absorption cross sections such as stainless steel, Inconel, and alloys of zirconium to minimize grid deformation and loss of structural integrity during irradiation. Conventional designs of grids for nuclear reactor fuel assemblies include a multiplicity of interleaved inner grid straps of egg-crate configuration designed to form cells which accept fuel rods. Vertically cut out slots in the inner straps at the locations of intersection between first inner straps, wherein the slots may be cut from the top of the strap to the middle of the strap, and second inner straps, which are perpendicularly interposed to the first inner straps, wherein the slot may be cut from the bottom of the second strap to the middle of the strap, such that the slots of the first and second inner straps interlock, as is commonly known in the art. The two opposing ends of each of the inner grid straps further are interlocked with the outer grid straps, thereby forming the periphery cells of the grid. Each cell provides support to one fuel rod at a given axial location through the use of relatively resilient springs of various forms. The outer grid strap segments are attached together and peripherally enclose the inner grid straps to impart strength and rigidity to the grid. In order to minimize the lateral displacement of fuel rods and to improve the fuel characteristics of an assembly, a number of grids are spaced along the fuel assembly length.

In pressurized water reactors (PWR), typically each grid is held in place along the fuel assembly by attachment to control rod guide thimbles. In a boiling water reactor (BWR), typically a can surrounds the fuel rods and grids. In the BWR, each grid is held in place along the fuel assembly length by a special locking rod. In one conventional BWR arrangement, at a given grid vertical location in the fuel assembly, there are four horizontally aligned grids in a square array separated by a water cross and surrounded by the can.

Typically, in an outer grid strap, there are four equivalent outer grid strap segments, each defining a planar end of the grid. Each outer grid strap segment is joined to another outer grid strap segment, forming generally a right angle, at the respective ends thereof. The outer grid strap segments are generally congruent with each other, each generally having coinciding inclined or otherwise curved ends. The respective ends of the outer grid strap segments overlap, and are held in place by various fixtures during manufacture of the grid, thereby controlling tolerances of the grid. The overlapped ends are fixedly bonded by either spot welding or by a cosmetic fusion pass or seam weld of the outside ridge of the overlapping ends if the outer grid strap is made of zircaloy, stainless steel or other material that may be welded, or by brazing the inside and outside ridges of the overlapping ends if the outer grid straps are made of Inconel or nickel plated Inconel or other nonweldable material. Representative welding apparatus and methods and fixtures, for holding grids during the welding process are disclosed in U.S. Pat. Nos. 4,556,776, 4,541,055 and 4,539,738, all assigned to the same assignee as the present invention.

Designers are constantly seeking to improve the means of manufacture of the grids. Areas of interest include reducing the number of welds required to form the grid, and meeting the stringent design envelope, or tolerances, on dimensional parameters of the grid. Further considerations include retaining the structural rigidity of the grid, and reducing the amount of material in the grid for minimizing neutron absorption and coolant flow interference by the grid. Therefore, what is needed is an outer grid strap with improved means for connecting the segments of the strap, taking into account the foregoing considerations.

SUMMARY OF THE INVENTION

A nuclear reactor fuel assembly grid comprising a first outer grid strap segment end, having a first tab arranged in substantially the same plane as the plane defined by the first end, a second outer grid strap end having a second slot arranged in substantially the same plane as the plane defined by the second end, the tab being substantially disposed in the slot, defining a socket therebetween, and a fork tine extending from the end of an inner grid strap interposed substantially perpendicularly in said socket.

DESCRIPTION OF THE DRAWINGS

The invention will become more readily apparent from the following description of preferred embodiments thereof shown, by way of example only, in the accompanying drawings, wherein.

DESCRIPTION OF THE PREFERRED EMBODIMENT

Figure 1:
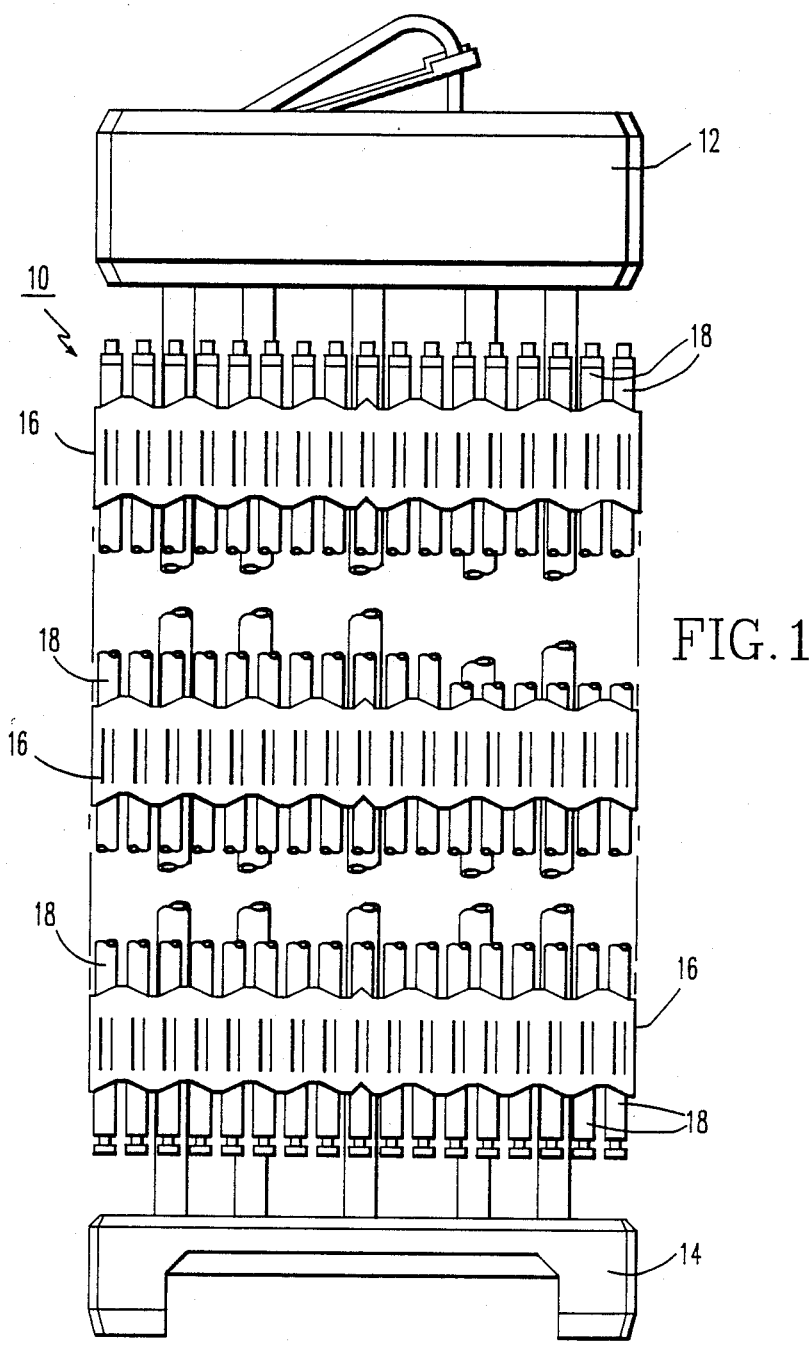
FIG. 1 is a straight-on view of a typical PWR nuclear fuel assembly.
Figure 2:
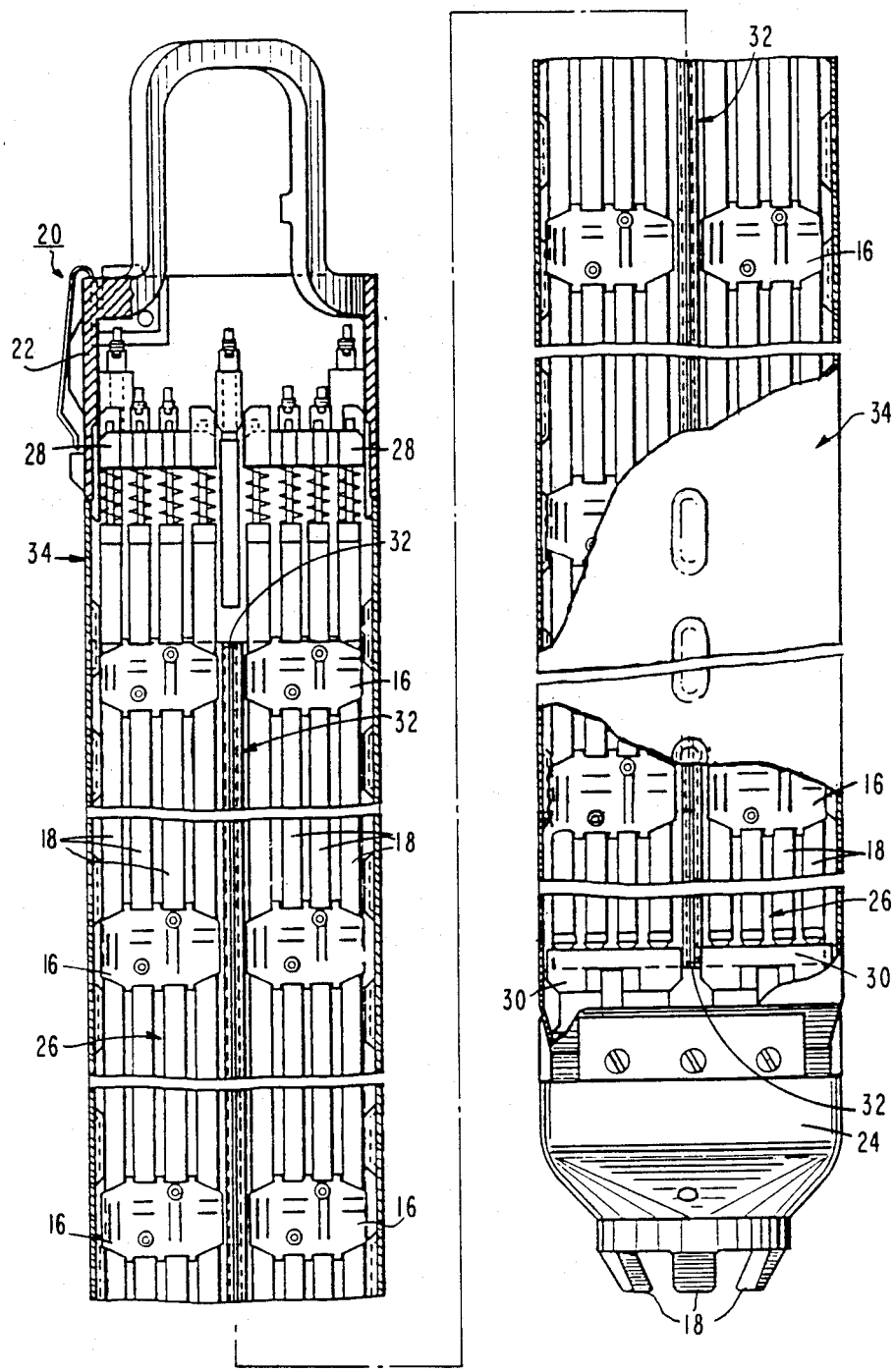
FIG. 2 is a partial cross-section view of a typical BWR nuclear fuel assembly, showing details within the can.

Reference will now be made in detail to several present preferred embodiments of the invention, some examples of which are illustrated in the accompanying drawings. In the drawings, like reference characters designate like or corresponding parts throughout the several views. The improvement of this invention is part of nuclear fuel assemblies 10, 20, as are well known in the art, as shown in FIGS. 1 and 2 of the drawings. FIG. 1 shows a typical PWR nuclear fuel assembly 10. As shown, the PWR nuclear fuel assembly 10 is a self-contained unit comprised of a top nozzle assembly 12 and a bottom nozzle assembly 14, between which is disposed a plurality of nuclear fuel assembly grids 16, maintaining, in proper configuration, a matrix of nuclear fuel rods 18 arrayed in rows and columns. The assemblies 12 and 14 and the grids 16 provide a skeletal frame to support the fuel rods 18. The nuclear fuel assemblies 10 are loaded into predetermined locations within a nuclear reactor and therefore, the orientation of the fuel rods 18 with respect to each other throughout the core is rigorously controlled.

Similarly, FIG. 2 shows a typical BWR nuclear fuel assembly 20, comprising a top nozzle assembly 22 and a lower inlet nozzle assembly 24. The nuclear fuel rods 18 are arrayed in rows and columns in a plurality of mini assemblies 26 comprising an upper support plate 28 and a lower support plate 30. The nuclear fuel rods 18 are held in mini assembly 26 configuration by a plurality of nuclear fuel assembly grids 16, which together with the upper support plate 28 and the lower support plate 30 provide a skeletal frame to support the fuel rods 18. The mini assemblies 26 are separated from each other by a water cross 32, and surrounded by a can 34. As in the PWR, the BWR fuel assemblies 20 are loaded into predetermined locations within a nuclear reactor and therefore, the orientation of the fuel rods 18 with respect to each other throughout the core is strictly controlled.

Figure 3:
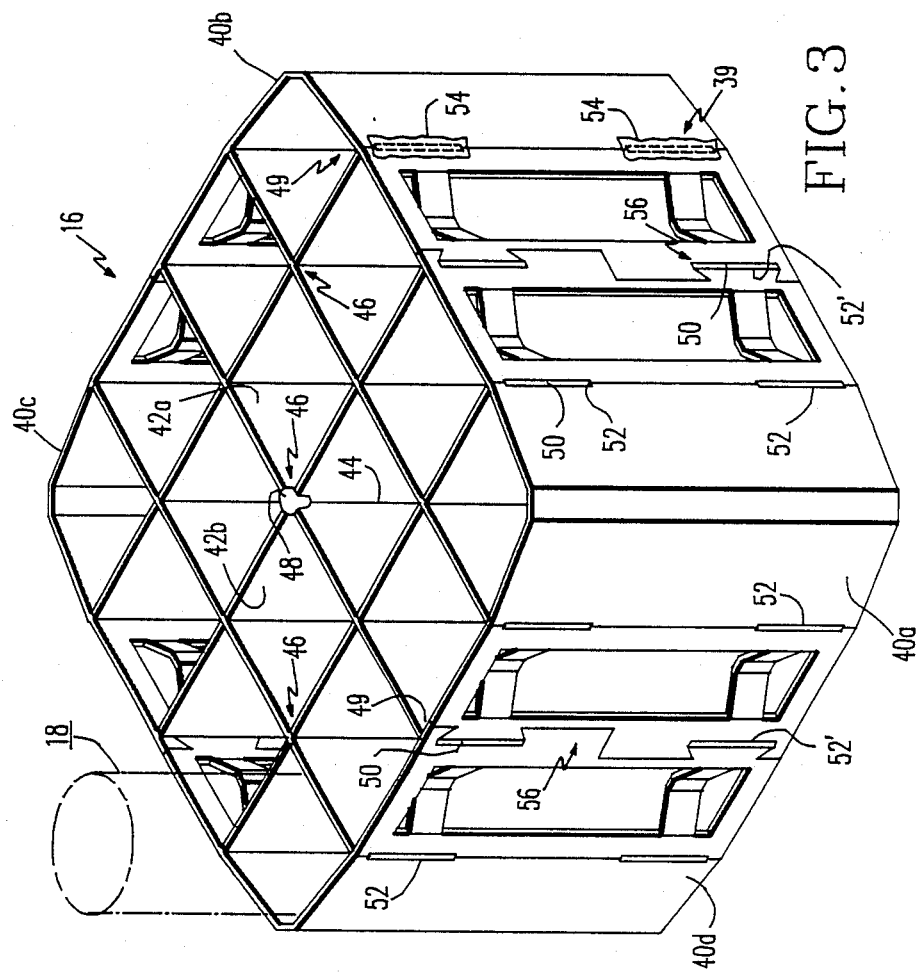
FIG. 3 is an isometric view of a BWR grid with outer grid strap segments showing an embodiment.

The present invention is, in one illustrative embodiment thereof, related to the manufacture of BWR nuclear fuel assembly grids 16 as shown in FIG. 3. The grid 16 is of approximately square configuration whose periphery is formed by an outer grid strap 39 comprised of four outer grid strap segments 40a, 40b, 40c, 40d. Two sets of spaced, parallel inner grid straps 42 are provided, the straps of the two sets being perpendicular to each other, whereby a plurality of square cells are formed to receive the nuclear fuel rods 18. Vertical slots 44 are cut out of the inner grid straps 42 at the locations of intersection 46 between first inner straps 42a and second inner straps 42b. As is more clearly shown in FIG. 4, the slots 44 may be cut from the top of the first strap 42a to the middle of the strap 42a, and from the bottom of the second inner straps 42b to the middle of the strap 42b. The first inner straps 42a are perpendicularly interposed on the second inner straps 42b, such that the slots 44 of the first and second inner straps 42a, 42b interlockingly engage, as is commonly known in the art. Looking back now at FIG. 3, an intersect weld 48 is formed at each of the points 46 of intersection, whereby a rigid grid structure is formed. Further, each of the inner grid straps 42 includes at each end 49 thereof one or more fork tines 50 of a size and configuration to be tightly interposed in sockets 52, 52' in the outer grid strap 39. The tines 50 and the sockets 52, 52' are generally rectangular in shape, but may be square, round, or any similar shape. A bond, representatively shown as 54, such as a slot and tab weld or braze, is effected along each socket 52, 52' in the outer grid strap 39. Preferredly, the interlocking joint 56 occurs where each of the preferredly four outer grid strap segments 40a, 40b, 40c, 40d is joined to each of their abutting outer grid strap segments; that is, 40a is joined to 40b and 40d, 40b is joined to 40c and 40a, 40c is joined to 40d and 40b, and 40d is joined to 40a and 40c, respectively. It is also possible to use this invention with as little as one outer grid strap segment 40, thereby forming the entire outer grid strap 39 with a single joint 56 by joining the opposite ends of the single segment 40. It is further possible to use this invention on a bi-metallic grid (not shown), where, for example, in a zircaloy grid, some of the inner grid straps are replaced with steel or Inconel springs.

Figure 4:
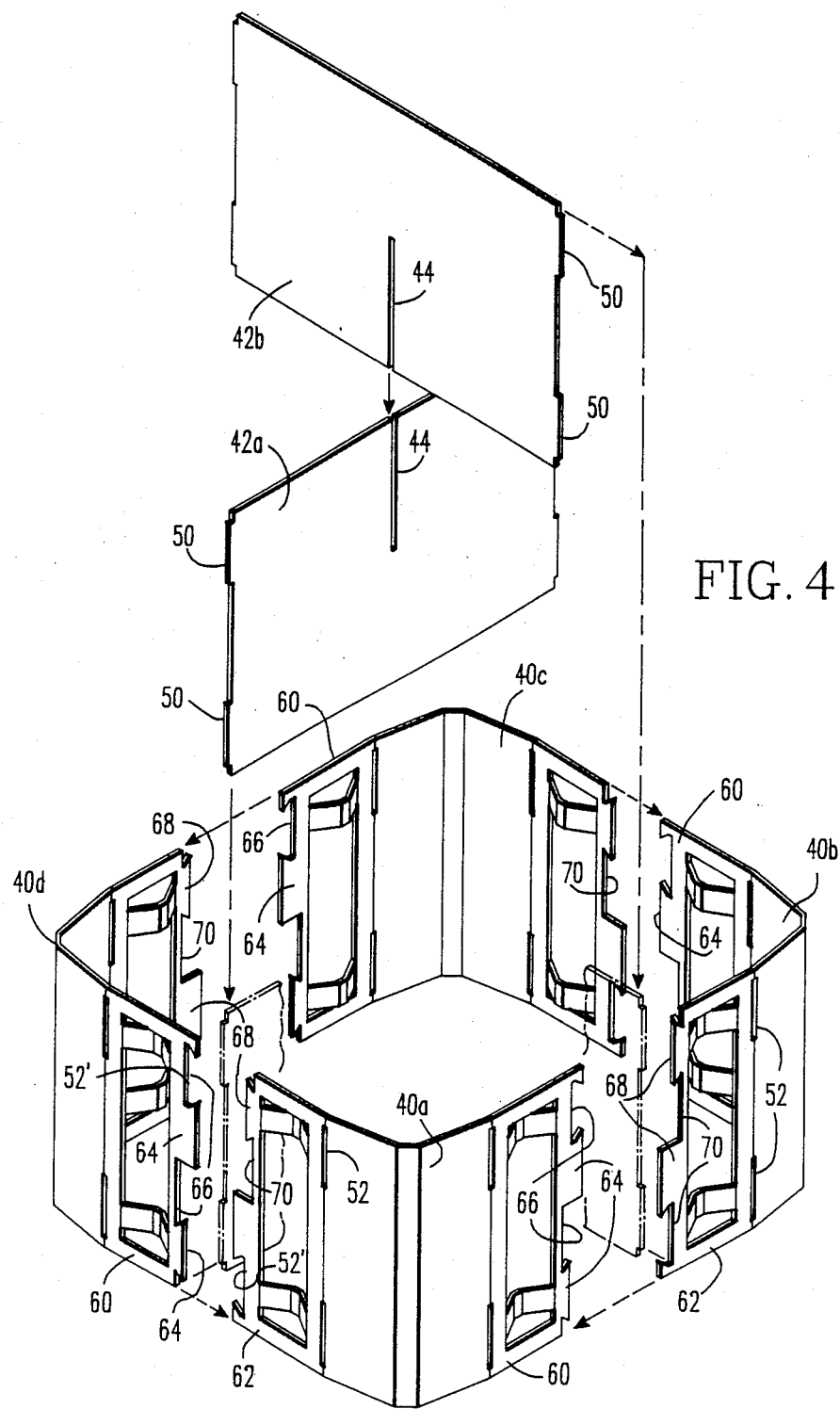
FIG. 4 is an exploded view of the embodiment depicted in FIG. 3, showing the typical intersection of inner grid straps, and the intersection of the inner grid straps with the outer grid strap segments.

Each outer grid strap segment 40a, 40b, 40c, 40d may be of generally L shape, looking now at FIG. 4, comprising a first end 60 and a second end 62. The first end 60 of each outer grid strap segment 40a, 40b, 40c, 40d comprises first tabs 64 and first slots 66 arranged in substantially the same plane as the plane defined by the first end 60. The second end 62 of each of the outer grid strap segments 40a, 40b, 40c, 40d comprises second tabs 68 and second slots 70 arranged in substantially the same plane as the plane defined by the second end 62. The first tabs 64 of the first end 60 of each outer grid strap segment 40a, 40b, 40c, 40d are disposed in the second slots 70 of the second end 62 of an abutting outer grid strap segment 40b, 40c, 40d, 40a respectively, and the second tabs 68 of the second end 62 of each outer grid strap segment 40a, 40b, 40c, 40d are likewise disposed in the first slots 66 of an abutting outer grid strap segment 40d, 40a, 40b, 40c respectively. The socket 52' is defined by gaps between the first tabs 64 and the second slots 70 and the second tabs 68 and the first slots 66, wherein the fork tines 50 of the inner grid strap 42 are inserted, substantially perpendicular to the plane generally formed by the first end 60 of the outer grid strap segments 40a, 40b, 40c, 40d and the second end 62 of the abutting outer grid strap segments 40b, 40c, 40d, 40a, respectively. The bond 54, which may be a slot and tab weld or braze, is effected along the plurality of sockets 52, 52' in the outer grid strap segments 40, thereby fixedly bonding each outer grid strap segment 40a, 40b, 40c, 40d to its abutting outer grid strap segment 40b, 40c, 40d, 40a, respectively, and the interposed inner grid strap 42.

Figure 5:
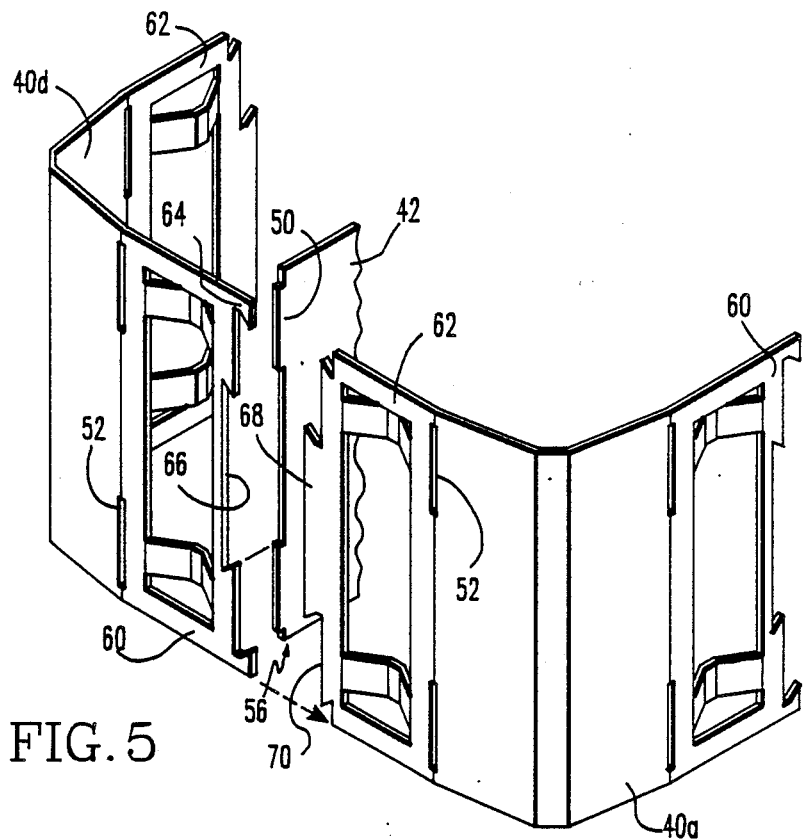
FIG. 5 is a partial exploded view of an alternative embodiment.
Figure 6:
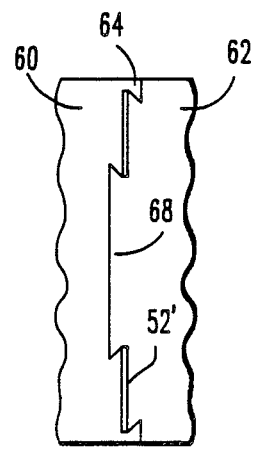
FIG. 6 is a straight-on view of the alternative embodiment depicted in FIG. 5.

A preferred embodiment of this invention comprises first and second tabs 64, 68 and first and second slots 66, 70 of generally dove tail shape. FIGS. 5 and 6 show one alternative embodiment of this invention. The fork tines 50 on the end 49 of the interfacing inner grid strap 42 aligns and locks each outer grid strap segment 40 to an abutting segment 40 (here shown as the connection of segments 40d to 40a) being interposed, substantially perpendicular to the plane formed by the first end 60 of the outer grid strap segment 40d and the second end 62 of the abutting outer grid strap segment 40a, within the socket 52' formed at the joint 56. The combination of the interlocking dove tail tabs 64, 68 and slots 66, 70 and the interposed fork tines 50 restricts movement of the outer grid strap segments 40a, 40b, 40c, 40d solely parallel to the plane of the inner grid strap 42 through the depth of the tines 50. The outer grid straps 40a, 40b, 40c, 40d will neither pull away perpendicularly from the tines 50, nor parallel to the tines 50 toward the inner grid strap 42, nor rotationally around the tines 50. Thus it will be obvious to one skilled in the art that when all four outer grid strap segments 40a, 40b, 40c, 40d are in place, they will align and lock the fuel assembly grid 16. Each outer grid strap segment 40a, 40b, 40c, 40d has enough flexibility such that the final segment may be emplaced on the fuel assembly grid 16 during manufacture. Finally, a bond 54, such as a slot and tab weld or braze, is formed to fixedly, bond the outer grid strap segments 40a, 40b, 40c, 40d and the inner grid straps 42 together.

The herein disclosed invention decreases the amount of material contained in the outer grid strap 39, while maintaining the structural strength of the grid 16. In addition, the outer grid strap 39 of the BWR grid 16 can more accurately conform to the curvature of the can 34 and water cross 32, thereby minimizing interference with coolant flow within the fuel assembly 20. Furthermore, this invention reduces the total number of welds or brazes required to construct the grid 16, since the normally performed bonds 54 of the inner grid straps 42 to the outer grid strap 39 herein perform the additional function of bonding the outer grid strap segments 40a, 40b, 40c, 40d together, obviating the need for extra welds or brazes in the corners as usually required for construction of the outer grid strap 39. Lastly, this invention holds the assembled grid 16 together and within required tight manufacturing tolerances, lessening the complexity of fixturing necessary to hold the grid 16 during the welding operation, and reducing the probability of producing an out-of-envelope grid 16.

It will be apparent that many modifications and variations are possible in light of the above teachings. It, therefore, is to be understood that within the scope of the appended claims, the invention may be practiced other than as specifically described.

What is claimed is:

1. A nuclear reactor fuel assembly grid comprising:
   a. a first outer grid strap segment end, said first end having a first tab arranged in substantially the same plane as the plane defined by said first end;
   b. a second outer grid strap end, said second end having a second slot arranged in substantially the same plane as the plane defined by said second end, with said tab being substantially disposed in said slot, defining a socket therebetween; and
   c. a fork tine interposed substantially perpendicularly in said socket.

2. The grid of claim 1, wherein said first end has said first tab and a first slot arranged in substantially the same plane as the plane defined by said first end, said second end has said second slot and a second tab arranged in substantially the same plane as the plane defined by said second end, said first tab is substantially disposed in said second slot defining a first socket therebetween, and said second tab is substantially disposed in said first slot defining a second socket therebetween.

3. The grid of claim 2, wherein said tabs and slots are generally of dovetail shape.

4. The grid of claim 2, wherein there is a plurality of said first tabs, said first slots, said second tabs, and said second slots.

5. The grid of claim 4, wherein there are two each of said tabs and said slots.

6. The grid of claim 1, wherein a bond fixedly joins said fork tine and said first end and said second end.

7. The grid of claim 6, wherein said bond is a slot and tab weld.

8. The grid of claim 6, wherein said bond is a braze.

9. The grid of claim 1, wherein there are four outer grid strap segments, each having a said first end and a said second end for joining abutting outer grid strap segments.

10. The grid of claim 9, wherein said outer grid strap segments are generally L shaped.

11. The grid of claim 1, wherein said first tab and said second slot are each of generally dovetail shape.

12. The grid of claim 1, wherein said fork tine extends from and substantially in the same plane as an end of an inner grid strap.

13. The grid of claim 1, wherein there are a plurality of fork tines.

14. A nuclear fuel assembly having a top nozzle, a bottom nozzle, a plurality of nuclear fuel rods vertically disposed therebetween, with at least one nuclear fuel assembly grid disposed therealong, said grid comprising:
   a. a plurality of outer grid strap segments, forming the periphery of said grid, each having a first end and a second end for joining abutting outer grid strap segments, said first end having a first tab arranged in substantially the same plane as the plane defined by said first end, and said second end having a second slot arranged in substantially the same plane as the plane defined by said second end, with said tab being substantially disposed in said slot, defining a socket therebetween;
   b. a fork tine interposed substantially perpendicularly in said socket; and
   c. a bond for fixedly joining said first end, said second end, and said fork tine.

15. The fuel assembly of claim 14, wherein said first end has said first tab and a first slot arranged in substantially the same plane as the plane defined by said first end, said second end has said second slot and a second tab arranged in substantially the same plane as the plane defined by said second end, said first tab is substantially disposed in said second slot and said second tab is substantially disposed in said first slot, defining said socket therebetween.

16. The fuel assembly of claim 15, wherein there is a plurality of said tabs and said slots.

17. The fuel assembly of claim 14, wherein there are four outer grid strap segments, each being generally L shaped.

18. The fuel assembly of claim 14, wherein said first tab and said second slot are each of generally dovetail shape.

19. The fuel assembly of claim 15, wherein said tabs and slots are generally of dovetail shape.

20. The fuel assembly of claim 14, wherein said fork tine extends from and substantially in the same plane as an end of an inner grid strap.

21. The fuel assembly of claim 14, wherein there are a plurality of fork tines.

22. The fuel assembly of claim 14, wherein said bond is a slot and tab weld.

23. The fuel assembly of claim 14, wherein said bond is a braze.

* * * * *